US008784172B1

(12) United States Patent
Racho

(10) Patent No.: US 8,784,172 B1
(45) Date of Patent: Jul. 22, 2014

(54) ONLINE GAMBLING AND INVESTING METHODS AND SYSTEMS USING BEHAVIORAL ECONOMICS

(71) Applicant: Jeffrey Racho, Austin, TX (US)

(72) Inventor: Jeffrey Racho, Austin, TX (US)

( * ) Notice: Subject to any disclaimer, the term of this patent is extended or adjusted under 35 U.S.C. 154(b) by 0 days.

(21) Appl. No.: 13/965,549

(22) Filed: Aug. 13, 2013

(51) Int. Cl.
*A63F 13/00* (2014.01)
*G07F 17/32* (2006.01)

(52) U.S. Cl.
CPC ........ *G07F 17/3244* (2013.01); *G07F 17/3286* (2013.01); *G07F 17/3241* (2013.01)
USPC ................................................ 463/6; 705/36

(58) Field of Classification Search
USPC ................................................ 463/6; 705/36
See application file for complete search history.

(56) References Cited

U.S. PATENT DOCUMENTS

| | | | | |
|---|---|---|---|---|
| 7,043,025 | B2 | 5/2006 | Alldredge | |
| 2005/0021439 | A1 | 1/2005 | Pinga | |
| 2006/0155631 | A1 | 7/2006 | Kondaks | |
| 2007/0106581 | A1 * | 5/2007 | Mitchell et al. | 705/35 |
| 2009/0089104 | A1 | 4/2009 | Kondaks | |
| 2009/0221358 | A1 | 9/2009 | Alldredge | |
| 2012/0122584 | A1 * | 5/2012 | Nguyen | 463/42 |
| 2013/0006833 | A1 * | 1/2013 | Tzroya | 705/37 |

OTHER PUBLICATIONS

Monaghan, "Responsible gambling strategies for Internet gambling: The theoretical and empirical base of using pop-up messages to encourage self-awareness." Computers in Human Behavior 25 (2009) 202-207. Elsevier, Amsterdam, The Netherlands. See pp. 204-206.

* cited by examiner

*Primary Examiner* — Paul A D'Agostino
*Assistant Examiner* — Ankit Doshi
(74) *Attorney, Agent, or Firm* — Panitch Schwarze Belisario & Nadel LLP

(57) ABSTRACT

Electronic gambling methods and systems comprising an electronic computer system operating electronic gambling software and optionally operating a data analytics engine which can be accessed by players using computing devices are disclosed. During the players' gambling sessions provided by the electronic gambling software, the electronic gambling system will present an "Investment Wager" to the players to induce them to move some or all their funds remaining in their gambling accounts to one or more investment accounts. The Investment Wager is implemented and designed based upon findings from behavioral economics, including loss aversion, the priming effect and the framing effect. The entity managing the electronic gambling system can act as the manager of the investment accounts, thereby yielding a potential revenue stream to the entity/manager.

30 Claims, 8 Drawing Sheets

ONLINE GAMBLING AND INVESTING METHODS AND SYSTEMS USING BEHAVIORAL ECONOMICS

CROSS REFERENCE TO RELATED APPLICATIONS

This nonprovisional patent application claims the benefit of the filing date of provisional application 61/804,128, filed 21 Mar. 2013, which is herein incorporated by reference.

STATEMENT REGARDING FEDERALLY SPONSORED RESEARCH AND DEVELOPMENT

No Federally sponsored research or development was requested for, accepted, or used in the development related to the embodiments disclosed and claimed herein.

BACKGROUND OF THE INVENTION

This disclosure relates to the field of online gambling and electronic gambling systems. More particularly, this disclosure relates to methods and systems for online and electronic gambling using theories of behavioral economics to incentivize users to invest part or all of their moneys in an investment account during the gambling session.

Online Gambling

Online gambling websites began to appear on the Internet shortly after the Internet began to develop as a means for consumer commerce in the 1990s. With the advent of smartphones in the 2000s, the term "online gambling" now includes electronic versions of games such as sports wagering, casino games, and poker that may be played and accessed using various wired and mobile computer systems, smartphones and tablet computers. For the purposes of this disclosure, "online gambling" shall mean any type of electronic gambling game available for play through an electronic communications network regardless if the end-consumer computing client uses a personal computer, smartphone, other mobile communications device or a tablet computer.

Although online gambling is legal in some nations, such as the United Kingdom and Australia, it is still of uncertain legality in the United States. The U.S. Department of Justice considers online gambling to be a violation of the U.S. Interstate Wire Act of 1961, which prohibits using a "wire communication facility" for the transmission in interstate commerce of bets or wagers. In recent years, the U.S. Fifth Circuit Court of Appeals interpreted the meaning of the Interstate Wire Act to prohibit sports-related wagers, but upheld a lower court ruling that the statute did not prohibit Internet gambling on "games of chance." Thus, the status of online gambling is still undetermined in the United States.

Operators of online casinos face certain current and future challenges. The online gambling marketplace, as seen from the experience in the United Kingdom and Australia, is extremely competitive and gambling sites are characterized by low profit margins due to percentage payouts that are higher than traditional casinos. The academic literature suggests that between 88% and 98.7% of the money wagered in online gambling goes back to the player as winnings (the "payout percentage"); this payout percentage is higher than typical Las Vegas type casinos, which have payout percentages on the order of 80-90%. Online casinos have found that they need to payout more to players to attract and retain them because online gamblers show little brand loyalty. Moreover, in order to attract users, online gambling operators spend large amounts on marketing and also offer "signup bonuses" to new players (where such bonuses do require a minimum amount of wagering before they may be cashed out).

Online gamblers do, however, place a high value on the "trustworthiness" and general reputation of online gambling sites. Gaming sites that are rated highly on these parameters do display a higher degree of brand loyalty. Online gamblers also appear to have a jaundiced view of online gambling sites. For example, the American Gaming Association surveyed online gamblers and discovered that many gamblers felt that casinos cheated players and believed that other players cheated while engaged in online gambling. Other surveys confirm these results and also indicate that players are concerned that online casinos could go out of business and fail to return deposited funds to the players. As seen from this discussion, any differentiating characteristic for an online casino will be extremely valuable since this can be used to increase brand loyalty and customer retention among fickle online gamblers.

A problem with gambling, whether online, in traditional casinos or using state-sanctioned lotteries, is that persons least able to afford spending money on games of chance are often the very people who gamble with a disproportionate amount of their incomes. The quarterly *National Affairs* cited a 2008 study by the Institute for American Values, which found that U.S. households with incomes below $12,400 spent approximately $645 per annum on lottery tickets. If that same $645 had instead been invested in publicly traded equities for a forty-year period, the investment's value would have grown to $87,000. The study concluded that even though low-income households had the economic means to invest and save, such households instead spent the money on gambling-type activities.

To further reduce the societal effects of gambling, development of systems to "safeguard" problem gamblers during online gambling sessions have become an industry priority. One industry adoption is the provision of means for gamblers to make voluntary, affirmative steps in order to "control" their gambling. This "self-exclusion" required by the player can be performed by self-imposed gambling limits and other options made available to the player. As the online gambling industry grows, such "socially responsible gambling" initiatives will provide other ways for online casinos to differentiate themselves from the competition and to achieve brand loyalty and a positive brand image.

Behavioral Economics

The field of behavioral economics first developed in the late 20$^{th}$ century when economist Richard Thaler and cognitive psychologists Amos Tversky and Daniel Kahneman began to apply psychological decision-making models to classical economic theory. Much of the academic research in the field is focused on how "real-world" economic behaviors differs from the "rational economic actor" model used in classical economic theory and attempts to use findings in human psychological behavior as a "bridge" to explain these discrepancies.

The work of Tversky and Kahneman identified the concept of "loss aversion" in behavioral economics, which is a concept that indicates that people much prefer avoiding losses to acquiring gains. Evidence suggests that losses can be far more powerful on the human psyche than a gain of equivalent "magnitude" (i.e., the emotional loss of $100 will be felt far more strongly than the emotional happiness of a $100 gain). Another possible manifestation of the loss aversion concept is the human predilection to focus on sunk costs—namely, those costs that have already been incurred by a firm or person and which cannot be recovered.

In traditional economic theory, a rational economic actor should disregard sunk costs and instead base an investment decision only on prospective, or future, costs. The loss aversion concept may explain "real world" behavior in which sunk costs do influence the behavior of firms and persons, indicating that such persons and firms do not follow the supposedly normative behavior of a rational economic actor. One such example is the "disposition effect," which is a tendency for investors to "hang on" to their losing investments while selling their winning investments. Experimental evidence indicates that, when faced with equal chances of winning and losing amounts, a person would need to gain approximately twice as much as the possible loss in order to be induced into accepting the wager.

The notion of loss aversion is explained by Tversky and Kahneman's "prospect theory," a theory in behavioral economics that seeks to describe how people behave when faced with probabilistic alternatives involving "sure" gains and "probabilistic" gains. The theory identifies "risk aversion," which is the tendency of a person, when confronted with two optional payoffs, to choose the potential payoff that may have a lower, but more certain, payoff value. For example, an investor faced with choosing an investment earning a risk-free rate of 3% may choose that investment over an equity investment that may promise a long-term rate of return of 10% but which will cause the investor to incur a risk of losing value on the investment during certain periods. Even when accounting for the investor's suggested tolerance for risk, such as the investor's age and assets, evidence indicates that many investors are risk averse when compared to the predicted normative behavior of a rational economic actor. Risk aversion is related to the human emotion of regret; a person may behave this way as a way to avoid regret, including paying an opportunity cost of not choosing the "better" probabilistic outcome. Generally, prospect theory states that, in a situation where both outcomes are "good," decision makers tend to prefer a sure thing over a gamble (exhibiting risk averse behavior), but that, in a situation where both outcomes are "bad," decision makers tend to reject a sure thing and accept a gamble (exhibiting risk-seeking behavior).

Tversky and Kahneman also determined that there is a "priming effect" that affects a person's economic decision-making. The priming effect is a memory effect in which a person's exposure to a stimulus, such as an image, influences the person's response, including emotional responses, to a later stimulus. A person's physical behavior and actions can even be primed to change through the ideomotor effect. In essence, due to the priming effect, a person's behavior and responses can be affected by presenting certain images or words to the person prior to the point when the person would have to perform the response.

Another element of behavioral economics that is relevant to this disclosure and that will be discussed is the "framing effect." The framing effect is seen where persons react differently to a particular choice—even a choice in which the two offered options are equivalent—depending upon whether the choices appear to be losses or gains. In the framing effect, persons generally choose the more "positive" frame of a choice rather than the "negative" frame of the same choice. Tversky and Kahneman have also published work indicating the existence of the framing effect.

SUMMARY OF THE INVENTION

The present disclosure provides methods and systems to address the above described online gambling issues and fulfills the needs described above by providing, in a preferred embodiment, a method for electronic gambling and investment, using a computer system, comprising the steps of providing a player access to an electronic gambling system, where said electronic gambling system operates an electronic game of chance to said player; the player initiating a gambling session to play the electronic game of chance; the player playing the electronic game of chance using a wager from a gambling account associated with the player; the electronic gambling system presenting an investment wager to the player when the player's behavior during the gambling session causes an investment wager triggering event; the investment wager comprising an offer to transfer at least a portion of the monetary funds remaining in the gambling account associated with the player and an additional amount of offered funds into a separate investment account associated with the player; if the player transfers all of the monetary funds remaining in the gambling account to said separate investment account, ending the gambling session upon acceptance of the investment wager by the player; depositing at least a portion of the monetary funds remaining in the gambling account associated with the player and the additional amount of offered funds into the separate investment account associated with the player; and purchasing securities using a least a portion of the monetary funds deposited in the investment account associated with the player.

Another embodiment of the present invention is an electronic gambling system, comprising an electronic computer system operating electronic gambling software that provides an electronic game of chance to a player, said electronic computer system having functionality to deposit funds into and withdraw funds from accounts at financial institutions, the electronic computer system further having functionality that (a) allows the player to initiate a gambling session to play the electronic game of chance, using at least one wager from a gambling account associated with the player; may present an electronic priming message to the player during the gambling session; (b) presents an investment wager to the player upon the occurrence of a wager triggering event, said investment wager comprising an offer to move at least a portion of the monetary funds remaining in the gambling account associated with the player and an additional amount of offered funds into an investment account associated with the player; (c) ends the gambling session upon acceptance of the investment wager by the player, (d) deposits the monetary funds remaining in the gambling account associated with the player and the additional amount of offered funds into the investment account associated with the player, and (e) purchases securities using a least a portion of the monetary funds deposited in the investment account associated with the player.

BRIEF DESCRIPTION OF THE SEVERAL VIEWS OF THE DRAWING

Referring now to the drawing, in which like reference numbers refer to like elements throughout the various figures that comprise the drawing. Included in the drawing are the following figures.

Figure 1:
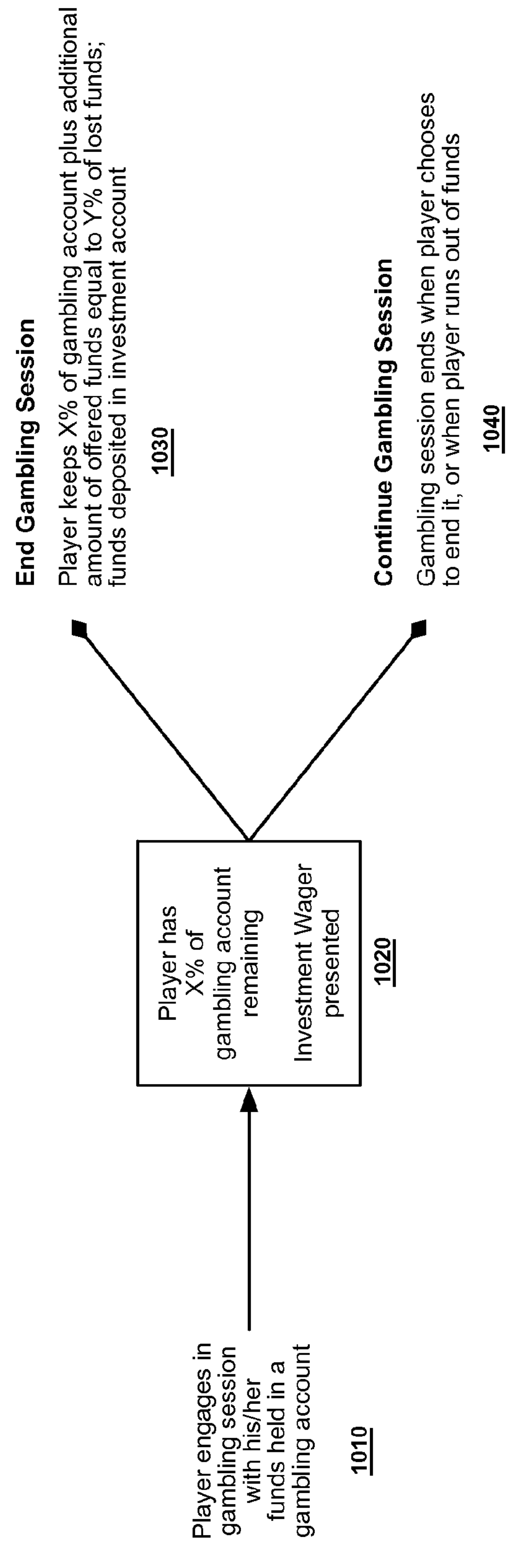
FIG. 1 is a decision tree diagram that depicts an embodiment of the disclosure in which a single "Investment Wager" is offered to the player once during the player's gambling session.

The embodiments are best understood from the following detailed description when read in connection with the accompanying drawing. It is emphasized that, according to common practice, the various features of the drawing are not to scale. On the contrary, the dimensions of the various features are arbitrarily expanded or reduced for clarity.

DETAILED DESCRIPTION OF THE INVENTION

Overall Description

A selected embodiment of the disclosure is an online or electronic gambling method and system to which a plurality of players is provided access. In one preferred embodiment, the electronic gambling system provides access to an electronic game of chance to the players; such electronic games of chance may include baccarat, bingo, blackjack, chuck-a-luck, craps, the dice wheel, dog racing, horse racing, keno, the money wheel, pachinko, pai gow, poker, roulette, slots, sports wagering and sic bo. A player may initiate a gambling session to play an electronic game of chance; the gambling session will continue for an amount of time until terminated by the player, until the player runs out of funds in the player's gambling account or until the player accepts an Investment Wager as defined and described below. The player will play the electronic game of chance with wagers from the gambling account associated with the player.

During the electronic gambling sessions, players who are generally "in the red" will be given an opportunity to invest their remaining funds into an investment account when the electronic gambling system presents an "Investment Wager" to the player when the player's behavior during the gambling session causes an investment wager triggering event. The Investment Wager comprises an offer to move some or all of the funds remaining in the gambling account associated with the player and a percentage of the "funds lost by the player" (represented by an additional amount of offered funds) into an investment account associated with the player. The funds moved to the investment account are then used to purchase securities for the investment account associated with the player.

Concepts derived from behavioral economics are used to increase the likelihood that the player will accept the Investment Wager instead of continuing to gamble and possibly losing the entire amount of the funds remaining in the gambling account associated with the player. From a behavioral economics perspective, the Investment Wager provides a choice to the player between the "sure thing" of the funds remaining in the gambling account associated with the player plus a percentage of the "funds lost by the player" (represented by an additional amount of offered funds) or the probability of continuing a losing streak and possibly losing even more money.

The Investment Wager may be applied to various types of electronic games of chance and may also be implemented on networked electronic computing devices located in physical gambling halls and casinos, such as networked slot machines. Information technology systems operating and hosting electronic or online gambling software, including IT systems designed for access to the electronic games of chance via personal computers, mobile phones, smartphones, mobile computing devices, tablet computing devices or other electronic devices capable of interfacing with or networking with the electronic gambling system.

Decision Tree Depictions

FIG. 1 presents a "decision tree" depiction of a selected embodiment of the disclosure. Decision trees are often used in decisions analysis and are a useful way to present the player's decisions during gambling sessions. In this embodiment of the disclosure, the player is offered one Investment Wager during the gambling session.

First, the player starts the gambling session with an amount of funds in a gambling account associated with the player 1010 that comprises the total funds that the player will have available for the gambling session; note that a player may be able to add more funds to his/her gambling account during the gambling session, and that the gambling account will increase or decrease with won and lost wagers, respectively. At some point of the session, the player will have X % of the funds in the gambling account remaining 1020, where "X" is a variable determined prior to or during the course of the gambling session. At this point, the player is presented with the Investment Wager, which functions as a decision node in the decision tree 1020. Should the player accept the Investment Wager, the gambling session will end and the funds remaining in the gambling account associated with the player (which equals X % of the funds remaining in the gambling account) plus an additional amount of offered funds, which represents a portion of the funds lost from the gambling account (which equals Y % of the lost funds, where "Y" is a variable determined prior to or during the course of the gambling session) are moved into the investment account associated with the player 1030. If the player declines the Investment Wager, the player will continue the gambling session until the player voluntarily ends it, or until the player runs out of funds in the gambling account 1040. This embodiment is depicted in flow chart form in FIG. 2, which is discussed below.

Figure 3:
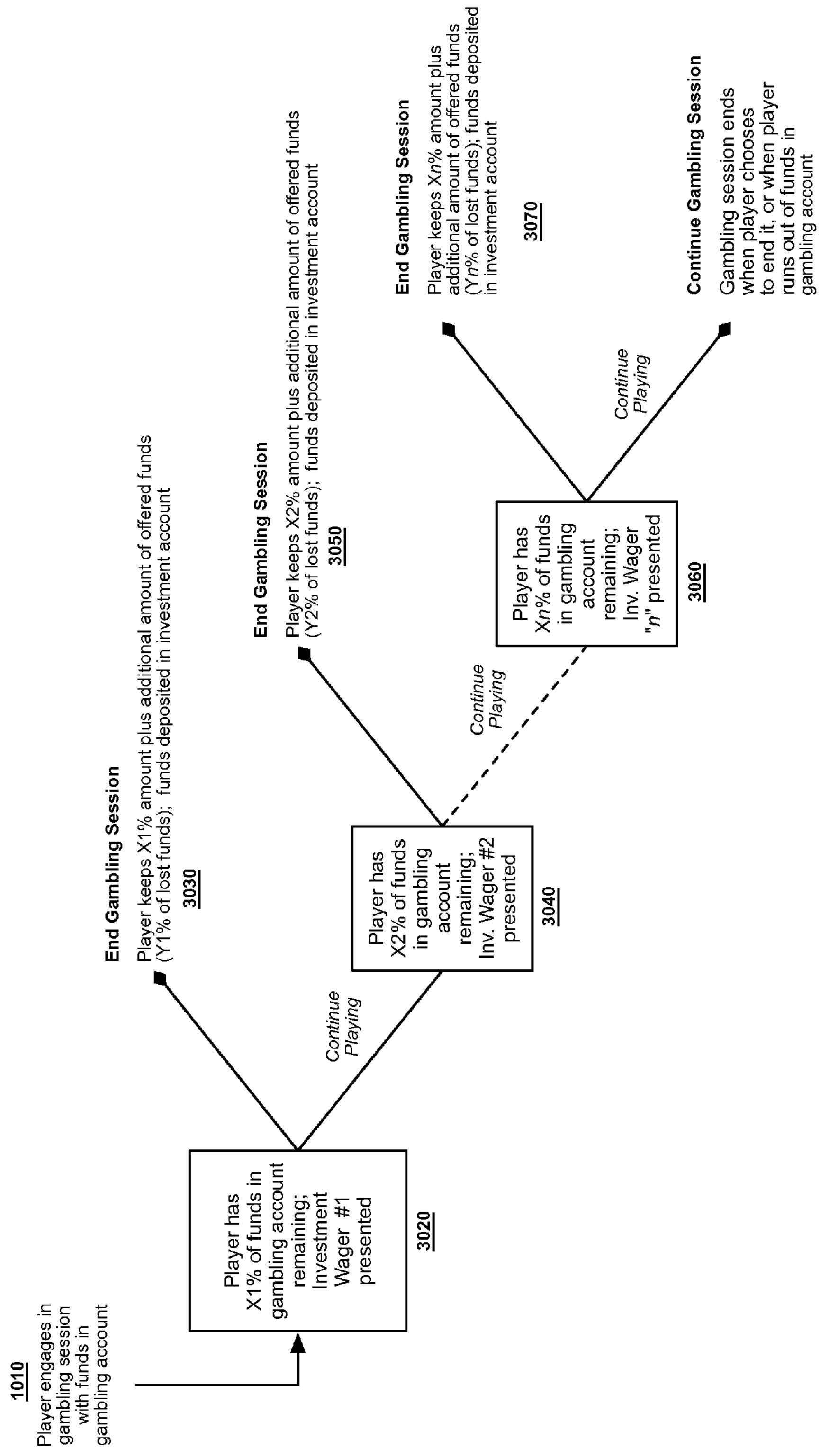
FIG. 3 is a decision tree diagram that depicts an embodiment of the disclosure in which n-number of "Investment Wagers" are offered to the player during the player's gambling session.

FIG. 3 presents a "decision tree" depiction of an embodiment in which the player is offered multiple Investment Wagers during the gambling session. The total number of Investment Wagers is represented by the variable "n" where n is equal to or greater than two (it is assumed that n is greater than two in FIG. 3). In this embodiment, the player starts the gambling session with an amount of funds in the gambling account associated with the player 1010 that comprises the total funds that the player will have available for the gambling session; note that a player may be able to add more funds to the gambling account during the gambling session. At some point of the session, the player will have X1% of the funds in the gambling account remaining 3020. At this point, the player is presented with the first Investment Wager, which functions as a decision node in the decision tree 3020. Should the player accept the first Investment Wager, the gambling session will end and the funds remaining in the gambling account (which equals X1% of the gambling account) plus an additional amount of offered funds, which represents a portion of the funds lost from gambling account (which equals Y1% of the lost funds, where "Y1" is a variable determined prior to or during the course of the gambling session) are moved into the investment account associated with the player 3030. Should the player decline the first Investment Wager, the player will continue the gambling session until the player has X2% of the funds in the gambling account remaining 3040. At this point, the player is presented with the second Investment Wager, which functions as a decision node in the decision tree 3040. Should the player accept the second Investment Wager, the gambling session will end and the funds remaining in the gambling account (which equals X2% of the gambling account) plus an additional amount of offered funds, which represents a portion of the funds lost from the gambling account (which equals Y2% of the lost funds, where "Y2" is a variable determined prior to or during the course of the gambling session), are moved into the player's investment account 3050.

Should the player decline the second Investment Wager, the player will continue the gambling session, receiving offers of Investment Wagers 3 to n until the number of Investment Wagers the player has received is equal to n−1, at which point the player has Xn % of the funds in the gambling account remaining 3060. At this point, the player is presented with the final n-number Investment Wager, which functions as a decision node in the decision tree 3060. Should the player accept the final n-number Investment Wager, the gambling session will end and the player's remaining funds (which equals Xn % of the funds in the gambling account) plus an additional amount of offered funds, which represents a portion of the funds lost from the gambling account (which equals Yn % of the lost funds, where "Yn" is a variable determined prior to or during the course of the gambling session), are moved into the player's investment account 3070. Should the player decline the final n-number Investment Wager, the player will continue the gambling session until the player voluntarily ends it, or until the player runs out of funds 3080. This embodiment is depicted in flow chart form in FIG. 4, which is discussed below.

Flow Chart Depictions

Figure 2:
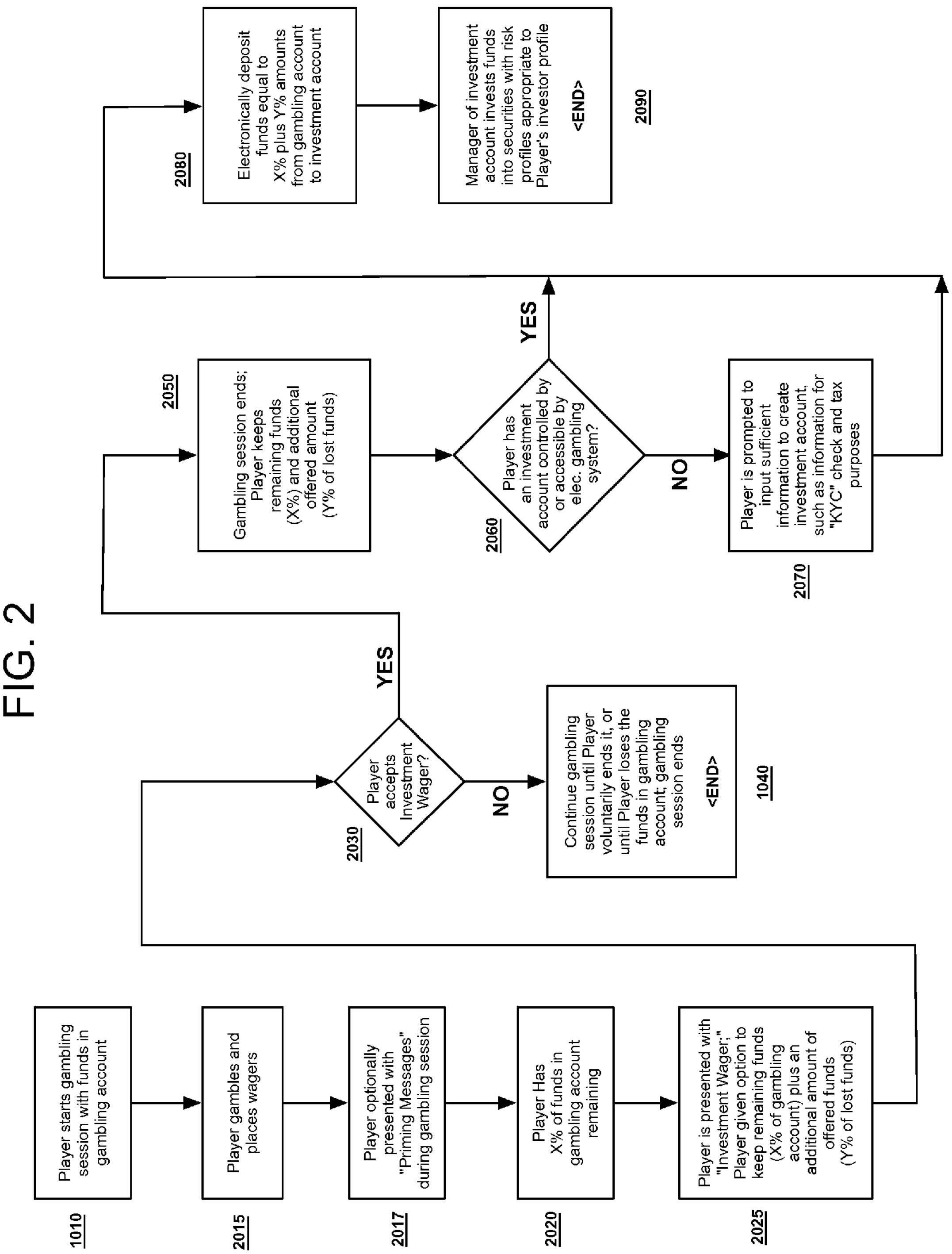
FIG. 2 is a flow chart diagram that depicts an embodiment of the disclosure in which a single "Investment Wager" is offered to the player once during the player's gambling session.
Figure 4:
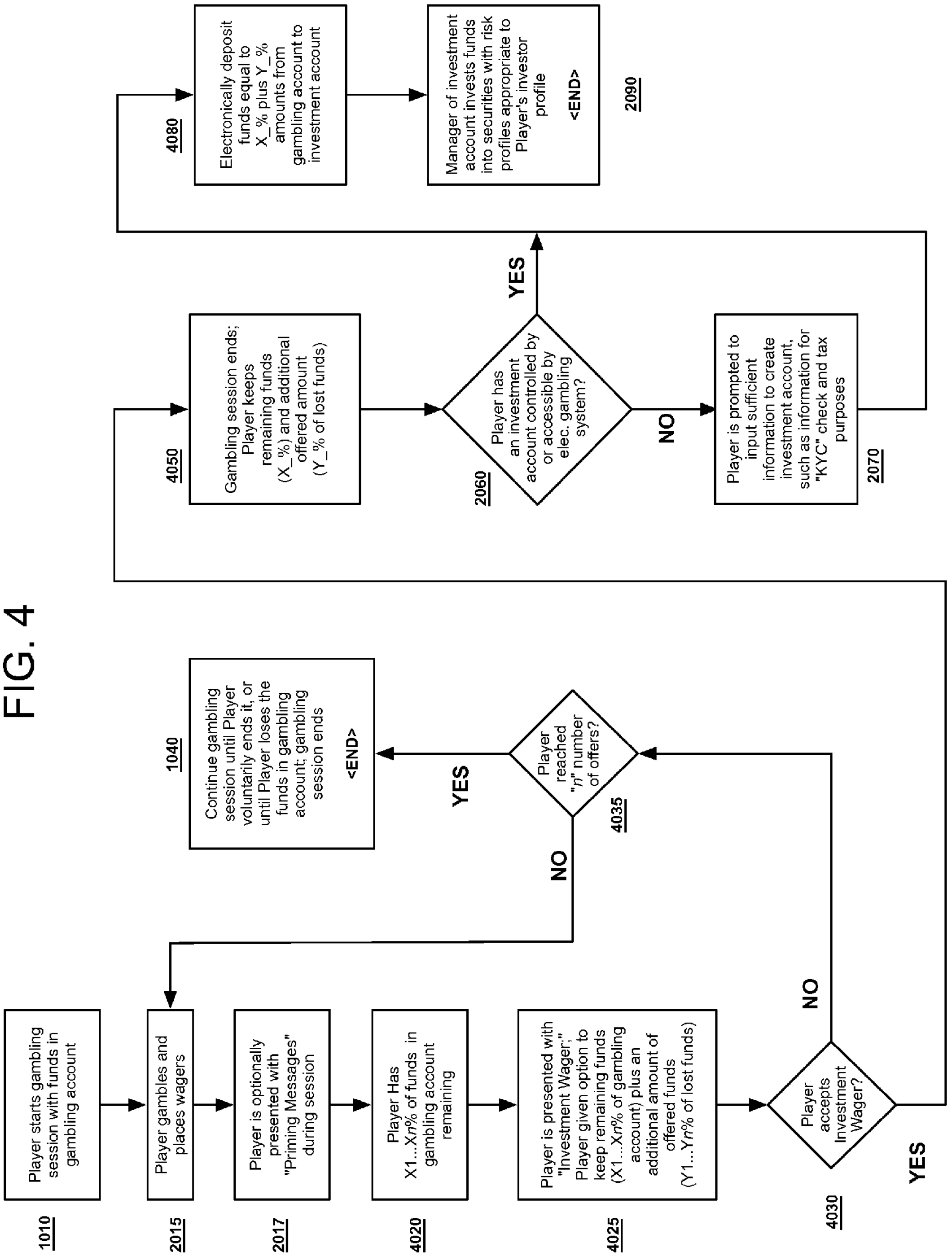
FIG. 4 is a flow chart diagram that depicts an embodiment of the disclosure in which n-number of "Investment Wagers" are offered to the player during the player's gambling session.

FIGS. 2 and 4 present flow charts to illustrate the process of the selected embodiments of the disclosure.

FIG. 2 presents a flow chart diagram of an embodiment of the disclosure in which the player is offered one Investment Wager during the gambling session. First, the player starts the gambling session with an amount of funds in the gambling account associated with the player 1010 that comprises the funds that the player will have available for the gambling session; note that a player may be able to add more funds to his/her gambling account during the gambling session, and that the gambling account will increase or decrease with won and lost wagers, respectively. The player will continue to gamble (statistically the player's gambling account will be reduced in value during the gambling session) by placing wagers on the electronic games of chance 2015. During the gambling session, the player may optionally be presented with messages, referred to as "Priming Messages," which may appear in pop-up windows or modal windows 2017. The Priming Messages will be described below. At some point of the session, the player will have X % of the funds in the gambling account remaining 2020. At this point, the player is presented with the Investment Wager; the player is given the option to keep the remaining X % of the funds his gambling account, plus an additional amount of offered funds, which represents a portion of the funds lost from the gambling account (which equals Y % of the lost funds, where "Y" is a variable determined prior to or during the course of the gambling session) 2025. The player must then decide whether to accept the Investment Wager or to continue gambling 2030. If the player declines the Investment Wager, the player will continue the gambling session until the player voluntarily ends it, or until the player runs out of funds 1040. The operator of the electronic gambling system can also take a "one chance" approach and inform the player upon making the Investment Wager that this is the only chance the player has to accept such an offer during the gambling session, which could cause the player to accept the Investment Wager so as to not "lose out" on the opportunity.

Should the player accept the Investment Wager, the gambling session will end and the player will keep the funds remaining in the gambling account (represented by X %) plus the additional amount of offered funds (represented by Y %) 2050. These funds will now be deposited into the investment account associated with the player. First, it is determined if the player has an investment account controlled by or accessible by the operator of the electronic gambling system 2060. If the player does have such an account, the casino operator moves the funds to the investment account 2080.

The account manager of the investment account then invests the funds by purchasing a security or financial instrument appropriate to the player's age and investor profile 2090. Such securities or financial instruments may be chosen from among the group consisting of index funds that track various indices (such as, by way of example, the Standard & Poors 500, the S&P MidCap 400 and the Wilshire 5000 Total Market Index), exchange traded funds, mutual funds, bond funds, money market funds and securities with risk profiles appropriate to the investor profile of the player. If the player does not have an investment account controlled by or accessible by the operator of the electronic gambling system, the electronic gambling system will prompt the player to input sufficient information to create an investment account, such as information for "know your customer" checks required by financial institution regulations and income tax purposes 2070; this information should also include answers to questions posed to the player so that the player's investor profile may be determined. Upon the submission of this information, the funds are moved to the newly created investment account 2080 and invested into a security or financial instrument appropriate to the player's age and investor profile 2090.

FIG. 4 presents a flow chart diagram of an embodiment in which the player is offered multiple Investment Wagers during the gambling session. First, the player starts the gambling session with an amount of funds in the gambling account associated with the player 1010 that comprises the total funds that the player will have available for the gambling session; note that a player may be able to add more funds to his/her gambling account during the gambling session. The player will continue to gamble (statistically the player's gambling account will be reduced in value during the gambling session) by placing wagers on the electronic games of chance 2015. During the gambling session, the player may optionally be presented with "Priming Messages," which may appear in pop-up windows or modal windows 2017. The Priming Messages will be described below. At some point of the session, the player will have a certain amount X1% of the funds in the gambling account remaining 4020. At this point, the player is presented with the first Investment Wager; the player is given the option to keep the remaining X1% of the funds remaining in the gambling account, plus an additional amount of offered funds which will equal Y1% of the player's lost funds 4025. The player must then decide whether to accept the first Investment Wager 4030.

Should the player accept the first Investment Wager, the gambling session will end and the player will be able to keep the remaining funds (X1%) plus the additional amount of offered funds (Y1%) 4050. The player's funds will be deposited into the player's investment account. First, it is determined if the player has an investment account controlled by or accessible by the operator of the electronic gambling system 2060. If the player does have such an investment account, the electronic gambling system deposits the funds into the investment account 4080.

The account manager of the investment account then invests the funds by purchasing a security or financial instrument appropriate to the player's age and investor profile 2090. Such securities or financial instruments may be chosen from among the group consisting of index funds that track various indices (such as, again by way of example, the Standard & Poors 500, the S&P MidCap 400 and the Wilshire 5000 Total Market Index), exchange traded funds, mutual funds, bond funds, money market funds and securities with risk profiles appropriate to the investor profile of the player. If the player does not have an investment account controlled by or accessible by the electronic gambling system, the electronic gambling system will prompt the player to input sufficient information to create an investment account, such as information for "know your customer" checks required by financial institution regulations and income tax purposes 2070; this information should also include answers to questions posed to the player so that the player's investor profile may be determined. Upon the submission of this information, the player's funds are moved to the newly created investment account 4080 and invested into a security or financial instrument appropriate to the player's age and investor profile 2090.

If the player declines the first Investment Wager, the electronic gambling system will determine if the player has reached the preset n-number of offers of the Investment Wager 4035. If the player has reached the preset n-number of Investment Wagers that are to appear, then no more Investment Wagers will be presented and the player will continue the gambling session until the player voluntarily ends it, or until the player runs out of funds 1040. The electronic gambling system may optionally notify the player of the number of times the Investment Wager will be presented during the gambling session.

If the player has not reached the preset n-number of Investment Wagers that are to be presented during the gambling session 4035, then the next iteration of the process begins. This process will continue until the preset n-number of Investment Wagers has been presented to the player.

After the next iteration begins, the electronic gambling system will allow the player to continue gambling 2015. The player may continue to be presented with optional Priming Messages 2017 during the session. When the player reaches the next value of X_% (ranging from X2% to Xn %) of the funds remaining in the gambling account 4020, the player will be presented with another Investment Wager which gives the player the option to keep the remaining X2% to Xn % of the funds remaining gambling account, plus the additional amount of offered funds (which equals Y2% to Yn % of the player's lost funds) 4025. The player is given the option to accept the Investment Wager corresponding to the values X2% to Xn % and Y2% to Yn % or to continue gambling 4030. If the player accepts the Investment Wager, the appropriate amount of the funds is deposited into the investment account 4050. If the player does not accept the Investment Wager, the electronic gambling system checks to see if the preset n-number of Investment Wagers has been reached 4035; if the number has been reached, the player will continue the gambling session until the player voluntarily ends it, or until the player runs out of funds 1040. If the number has not been reached, the process begins with the next iteration and continues until the n-number of Investment Wagers have been presented, after which the player will continue the gambling session until the player voluntarily ends it, or until the player runs out of funds 1040.

Note that the X1 . . . Xn % values need not be set to decrease sequentially; each X1 . . . Xn % value can be set by the operator of the electronic gambling system, or can vary according to an algorithm based upon analytics from player behavior. A subsequent Xn % value can be less than or greater than the preceding Xn-1% value. Likewise, the Y1 . . . Yn % values need not be set to decrease sequentially and each Y1 . . . Yn % value can be set by the operator. The values X1 . . . Xn % and Y1 . . . Yn % can also vary from gambling session to gambling session to make the gambling session more "unexpected" for the player or to better induce the player to accept an Investment Wager at some point during the gambling session.

Description of the Priming Message

Figure 5:
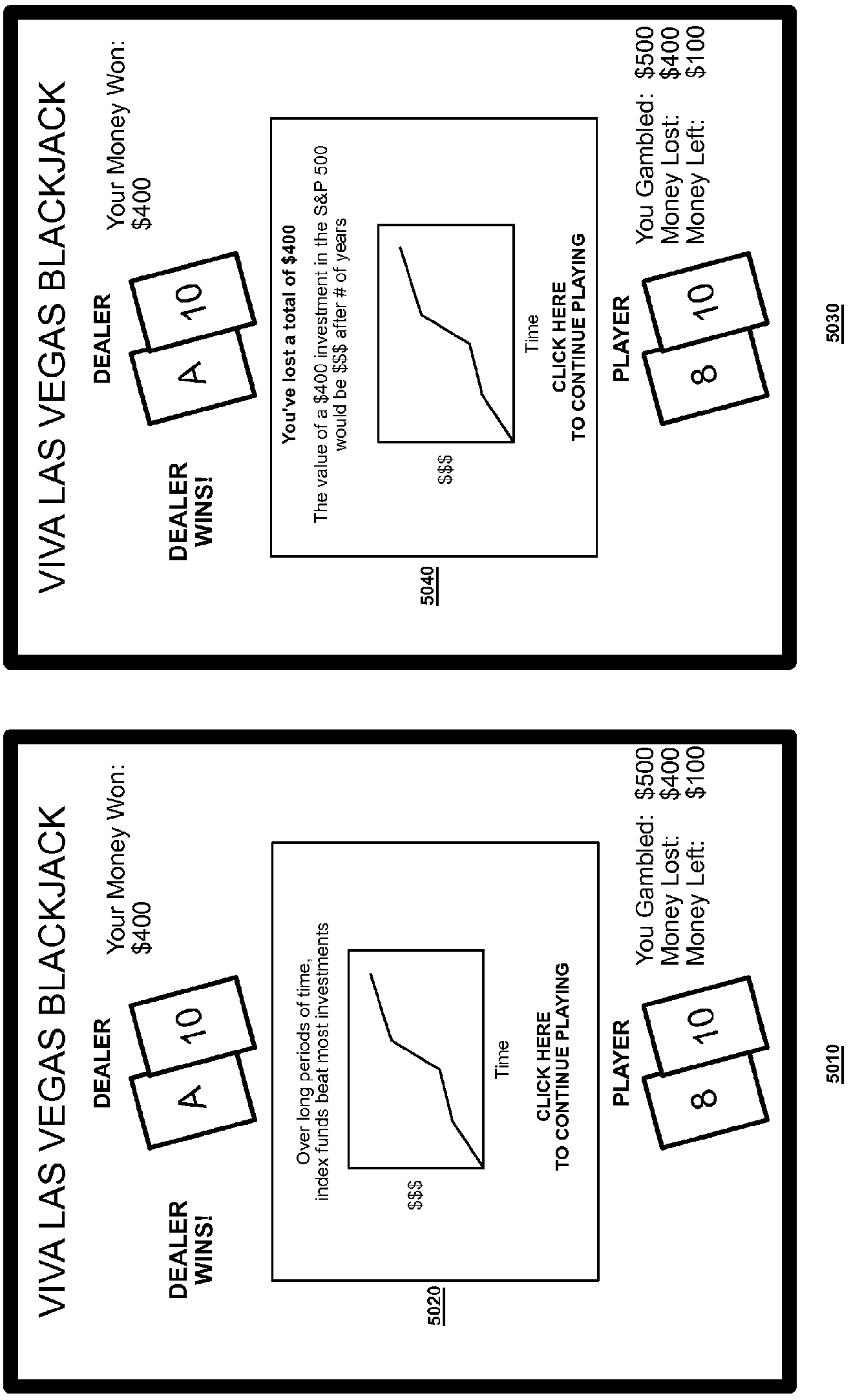
FIG. 5 is a depiction of two versions of the "Priming Message" which may be optionally presented to the player during the player's gambling session.

During the course of the game, the electronic gambling system may present an electronic priming message to the player during the gambling session. The electronic gambling system may intermittently display "pop-up" messages, pop-up windows or modal windows may intermittently during the gambling session. These pop-up messages, pop-up windows or modal windows will be used to present the Priming Message, which is designed to use the priming effect to prepare the player for the Investment Wager—and to increase the likelihood that the player will accept the Investment Wager—by instilling investment themes in the player's mind. FIG. 5 displays two screens of an electronic gambling session; each screen displays a different version of the Priming Message displayed during a game of blackjack 5010, 5030.

The Priming Messages that may appear during play may involve investment themes. For example, the Priming Message may use "generic" messages, such as charts, indicating that over long-term periods of time certain investments, such as index funds, do increase in value. An example "generic" Priming Message is displayed in FIG. 5 as a pop-up window appearing on the gambling screen 5020. The Priming Message can also be custom tailored to the individual gambling session. For example, the pop-up window can display a chart (generated by the electronic gambling system) that indicates what the long-term investment return would have been had the player invested his lost funds. An example "custom" Priming Message is displayed in FIG. 5 as a pop-up window appearing on the gambling screen 5040; this Priming Message expressly indicates how much the player has lost, and shows the long-term value of what this lost amount would've been had the player invested it in an S&P 500 index fund.

In addition to the priming effect described above, the Priming Messages would have the effect of instilling "regret" in the player, which may help cause the player to exhibit "loss aversion" behavior later in the game. Such regret could also increase the likelihood that the player would accept the Investment Wager presented during the gambling session.

Thus the electronic priming message may contain content from the group consisting of: information on long term investing, information related to the value of the monetary funds the player has lost from the gambling account associated with the player during the gambling session, the projected return of an investment based on the value of the monetary funds the player has lost from the gambling account associated with the player during the gambling session, and information related to the wagers the player has lost during the gambling session Description of Investment Wager When the player's remaining funds have reached a certain percentage of the gambling account, whether X % in the embodiment presented in FIG. 1-2 or X1 . . . Xn % in the embodiment presented in FIGS. 3-4, the electronic gambling system will prompt the player with the Investment Wager. As described above and on FIGS. 1-4, the Investment Wager takes the form of an offer to deposit the funds remaining in the player's gambling account into an investment account associated with the player. In addition to the funds remaining in the player's gambling account, a small portion of the funds lost by the player (the additional offered amount) will be invested into the player's investment account if the player accepts the Investment Wager. In effect, the additional offered amount "juices" the offer of the Investment Wager.

Figure 6:
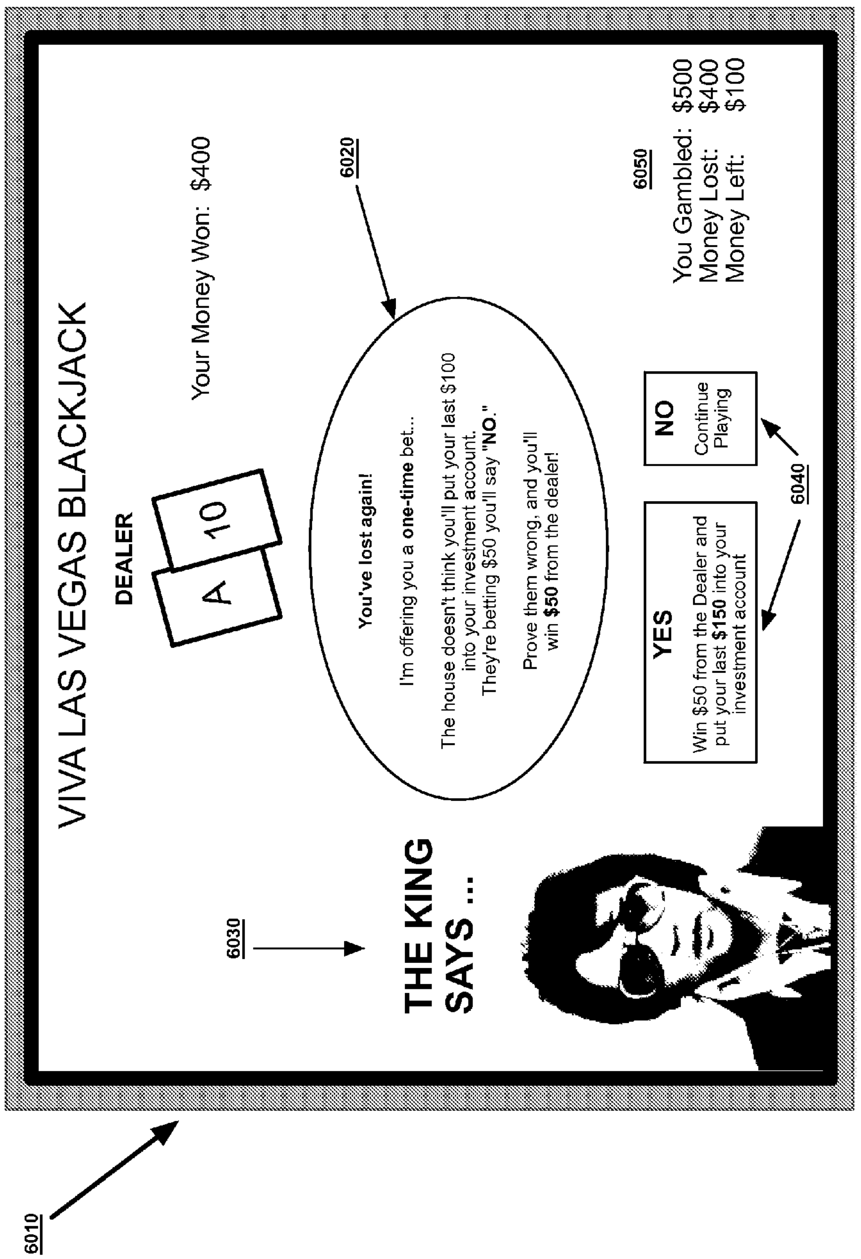
FIG. 6 is a depiction of an electronic screen on a computer, tablet or smartphone displaying an Investment Wager to the player.

FIG. 6 presents a view of the Investment Wager on a screen of an electronic computing device viewable by a player during an example game of blackjack. The screen of the electronic computing device displaying the electronic game of chance 6010 will temporarily pause after the player's gambling account has reached X % in the embodiment presented in FIG. 1-2 or X1 . . . Xn % in the embodiment presented in FIGS. 3-4. At this point the Investment Wager will be presented on the screen 6020. The Investment Wager may be optionally accompanied by an avatar 6030, as described below, and can also ensure that the player is aware of how much money he/she has lost during the session 6050. The player will have an opportunity to accept or decline the Investment Wager using buttons on the display screen 6040. The Investment Wager may include certain information, such as one or more of the elements from the group consisting of: a notice to the player of the number of investment wagers that will be presented to the player during the gambling session, a notice of the amount of monetary funds lost from the gambling account associated with the player during the gambling session, and an electronic avatar.

The Investment Wager will not just be a "simple offer," however; the concepts of behavioral economics must be implemented to ensure that the player does move his/her remaining funds to the investment account.

First, the player will have lost a sizeable portion of his/her funds and both the loss and the remaining amount (X %, X1 . . . Xn %) of funds will be displayed on the screen 6050. He/she will have seen any optional Priming Messages displaying the effects of long-term investing or the growth of the lost funds over time had they been placed in securities or financial instruments. The displayed loss and Priming Messages will cause a "loss aversion" reaction in the gambler. The feelings of loss aversion may be exacerbated if the Investment Wager includes a notice to the player of the number of investment wagers that will be presented to the player during the gambling session because the player could feel a sense that he/she should not pass up the Investment Wager when its final few appearances are presented. If the Investment Wager were to be presented only once, it would be stressed as a "one-time" bet (as seen in FIG. 6) in order to urge the player to accept it.

Second, the Investment Wager will also rely the player's risk aversion at this point of the gambling session. The player has only a certain amount of his/her funds left, and may feel that accepting the Investment Wager and moving the funds to an investment account may be preferable to the risk of attempting to "win back" the lost portion of the player's gambling account.

Third, the Investment Wager will be framed as a "bet" or "sure thing" that the player can "win" against the casino despite the player's lost funds; thus, the Investment Wager will be framed as a "win" and will not be framed as "accepting a loss." The Investment Wager message 6020 will notify the player that accepting the Investment Wager and depositing the remaining funds in the player's gambling account to the player's investment account will include the additional amount of offered funds. The Investment Wager will describe the additional amount of offered funds as a bet by the casino that the player will not accept the investment wager. As described above, the additional amount of offered funds will be Y % or Y1 . . . Yn % of the player's lost funds and will be less than the amount of monetary funds lost from the gambling account associated with the player during the gambling session.

The additional offered amount portion of the Investment Wager will be framed as a gaming activity in which the player can "beat" the house or casino and accept the Investment Wager as a way to "win" or earn a "sure thing" against the casino. This would be consistent with findings in behavioral economics; experiments indicated that, when two equivalent choices were presented to subjects, the subjects were more likely to accept a "sure thing" if the choice was framed as a person "keeping" something (thereby exhibiting loss aversion), while if the choice was framed as a "loss" then subjects were more likely to exhibit risk-seeking behavior and accept a gamble.

Many casino gaming machines have "themes" based on popular entertainment. There are gaming machines based on movie franchises, such as Star Wars, The Lord of the Rings, and Aliens; television shows, such as Sex and the City, and rock music performers, such as Elvis Presley and the band KISS. If the electronic gambling system adopted such a theme, an "avatar" related to the theme could appear in the Investment Wager screen to convey the Investment Wager to the player. For example, as seen in FIG. 6, an animated version of Elvis Presley 6030 could inform the player that the casino "is betting that you won't take this offer" and that, should the player accept the Investment Wager, he/she will "win" against the casino. Electronic avatars are helpful as "guides" and inclusion of the avatar, especially one that might have some "I'm looking out for you" rapport with the player, could further increase the player's likelihood of accepting the Investment Wager. In the event that the electronic gambling system did not have a theme, a generic avatar, such as an image of a dealer or croupier, could appear in the Investment Wager.

Finally, from the perspective of behavioral economics, it is unlikely that Investment Wagers presented to persons who are "up" against the house will be effective in moving players' funds to their investment accounts. The phenomenon of "mental accounting"—when persons divide a pool of fungible cash into different types of accounts—arises during gamblers' behavior. Gamblers who win amounts often consider their winnings as "house money;" some gamblers even use the phrase "gambling with the house's money" to refer to gambling with winnings earned from the casino. Experimental evidence exists that indicates gamblers exhibit greater risk-seeking behavior when gambling with such winnings as opposed to displaying more risk averse behavior when gambling with their "own" funds, or the funds initially committed to the game. The Investment Wager is designed to work with this phenomenon because it will be presented when the player is "down" and is using his/her gambling account to gamble instead of using "house money;" in such a situation, a player should become more risk averse. The behavioral economics literature, however, does indicate that some persons do become risk-seeking when they are "down" on investments; it stands to reason that players may attempt riskier behavior to win back the lost value of their gambling accounts. Thus, the messages presented in the Investment Wager must be strong, and framing the Investment Wager as described above should increase the likelihood that the player will accept the Investment Wager.

Although it is unlikely that players who are "up" against the house will accept an Investment Wager, embodiments may be implemented in which Investment Wagers may be presented to players who are winning during their gambling sessions. Evidence from gambling sessions recorded by the data analytics engine, described below, may indicate that players who are "up" will accept Investment Wagers. In this embodiment, the casino operator may view offering Investment Wagers to players "in the black" as a way to improve player loyalty. Casino operators may determine that making such Investment Wager, which may include additional amounts of offered funds described as "bonuses," could be economically beneficial over the long term to build player loyalty and would function as marketing incentives akin to the "signup bonuses" offered to new players.

Investment of Player's Funds

Should the player accept the Investment Wager, the gambling session will end and the player's remaining stake (X %, X1 . . . Xn % of the gambling account) and the additional amount of offered funds (Y %, Y1 . . . Yn % of the lost funds) will be moved to the player's investment account.

Note that, if the player decides to end the gambling session voluntarily, the operator of the electronic gambling system can offer to move the player's remaining funds to the investment account. The likelihood of whether the player accepts this version of the offer will likely depend upon how badly the player has performed; in all likelihood "winning" players will simply hold onto their winnings for a future gambling session and not direct them into the investment account. This offer can optionally include an additional amount either comprising a portion of the player's lost funds or as a "bonus" for players having winning gambling sessions.

The player should have, upon account signup with the operator of the electronic gambling system, provided sufficient personal information in order to set up an investment account at a financial institution, brokerage house or mutual fund company. The player will be required to supply personal information for "know your customer" checks required by financial institution regulations and income tax purposes. In the event the player has not supplied this information, the player must be prompted to supply this information during gameplay 2070 so that his/her funds can be properly moved to the investment account. The player should also supply information, such as answers to questions related to the player's age and risk exposure, so that the player's investor profile may be determined and so that securities appropriate to the player's investor profile may be purchased in the player's investment account.

The business entity operating the electronic gambling system can also manage the investment fund for the players. This business entity can charge "management fees" to the players' accounts, thereby providing an additional revenue stream to the business entity. This revenue could even provide higher long-term revenue to the business entity than the revenue "lost" through the additional amounts of offered funds included in the Investment Wager; these amounts normally would have been gambling revenue to the business entity but are instead returned to the player and subsequently deposited into the investment account.

Once players have moved their funds to the investment account, the business entity should take certain steps to ensure that the players do not attempt to "game" the system by moving the funds immediately out of the investment account and back into a gambling session. Thus, the entity managing the funds can choose to apply an early withdrawal penalty to the investment account associated with the player should the player perform a withdrawal from the investment account before a predetermined period of time has elapsed. This early withdrawal penalty is akin to the early withdrawal penalties found on certificates of deposits or mutual funds. This penalty ensures that adequate revenue from funds management will be earned and that the players will earn a return on their invested funds; if the players do not withdraw funds from their accounts to fund gambling activities, they will become long-term investment accounts and provide an investment return to the players.

Generally, an entity regulated under applicable securities laws will manage the investment account associated with the player. This would add a level of "trust" between the players and the casino operator because the invested funds will be held at an institution that has a legal duty to the players arising from holding the invested funds. As seen previously, such trust was a factor in customer loyalty and this increased trust between the player and business entity could increase brand loyalty to the business entity's online gambling site. Brand loyalty would also be achieved since the player now has funds "locked in" the investment account and would return to the online gambling site to withdraw the available funds in the account (of course, subject to the penalty described above), to log in to check his/her investment account balance, or to gamble additional funds. The business entity managing the investment accounts could be the online casino operator, a subsidiary or affiliate of that operator, or the operator could retain a brand name firm, such as Fidelity or Vanguard, to manage the investment accounts. Hiring such a marquee firm would also increase the level of trust between the casino operator and the players.

"Nudged" Investment Contributions

Behavioral economist Richard Thaler developed a concept called a "nudge." The "nudge" is intended as the "default" decision or choice in a system that requires a person to make a decision or a choice. The "nudge" is designed to affect the "choice architecture," or the way that choices are presented to persons, of a system or process so that persons failing to make an affirmative choice will receive the "default" decision preferred by the choice architect. As an example, Thaler pointed out that most employees fail to increase their contributions to retirement plans when they receive pay raises. This is often because the employee must take the affirmative step of requesting the contribution increase, meaning that the employee most often ends up with the default decision—which is no contribution increase. To change this choice architecture, Thaler devised a proposed "Save More Tomorrow" retirement plan. Companies adopting this plan would offer their employees a default choice where contributions to retirement plans would automatically increase commensurate with any increases in an employee's salary. The employee would have the option not to accept this default choice, but the employee would need to take an affirmative step to "opt out" since the default setting for the retirement plan would be the automatic contribution increase. Thus, the "nudge" would increase the amount that the employee would save for retirement because most employees would remain with the default choice.

The "nudge" concept could optionally be applied in embodiments of the disclosure. In one such embodiment, if the player wins a wager placed during the electronic game of chance, the player will receive winning proceeds from the wager and all or a portion of the winning proceeds can be deposited automatically into the investment account unless the player takes a voluntary action to prevent such deposit or takes a voluntary action to modify the portion that is to be deposited. In another embodiment, all or a portion of winnings on certain types of wagers—such as wins on "insurance bets" in blackjack, "odds bets" in craps or "proposition bets"—could be automatically deposited into the investment account as a pre-set "default" setting on the player's account. Again, the deposit would occur unless the player takes a voluntary action to prevent such deposit or takes a voluntary action to modify the portion that is to be deposited. In another embodiment, if the player voluntarily ends the gambling session, the electronic gambling system would deposit the funds remaining in the gambling account associated with the player into the investment account associated with the player automatically, upon the player's request, or upon acceptance by the player of an offer to make the deposit with a bonus amount. The player, of course, could modify these default settings at some point, much like the hypothetical employee in Thaler's "Save More Tomorrow" retirement plan.

Overview of System Architecture

Figure 7:
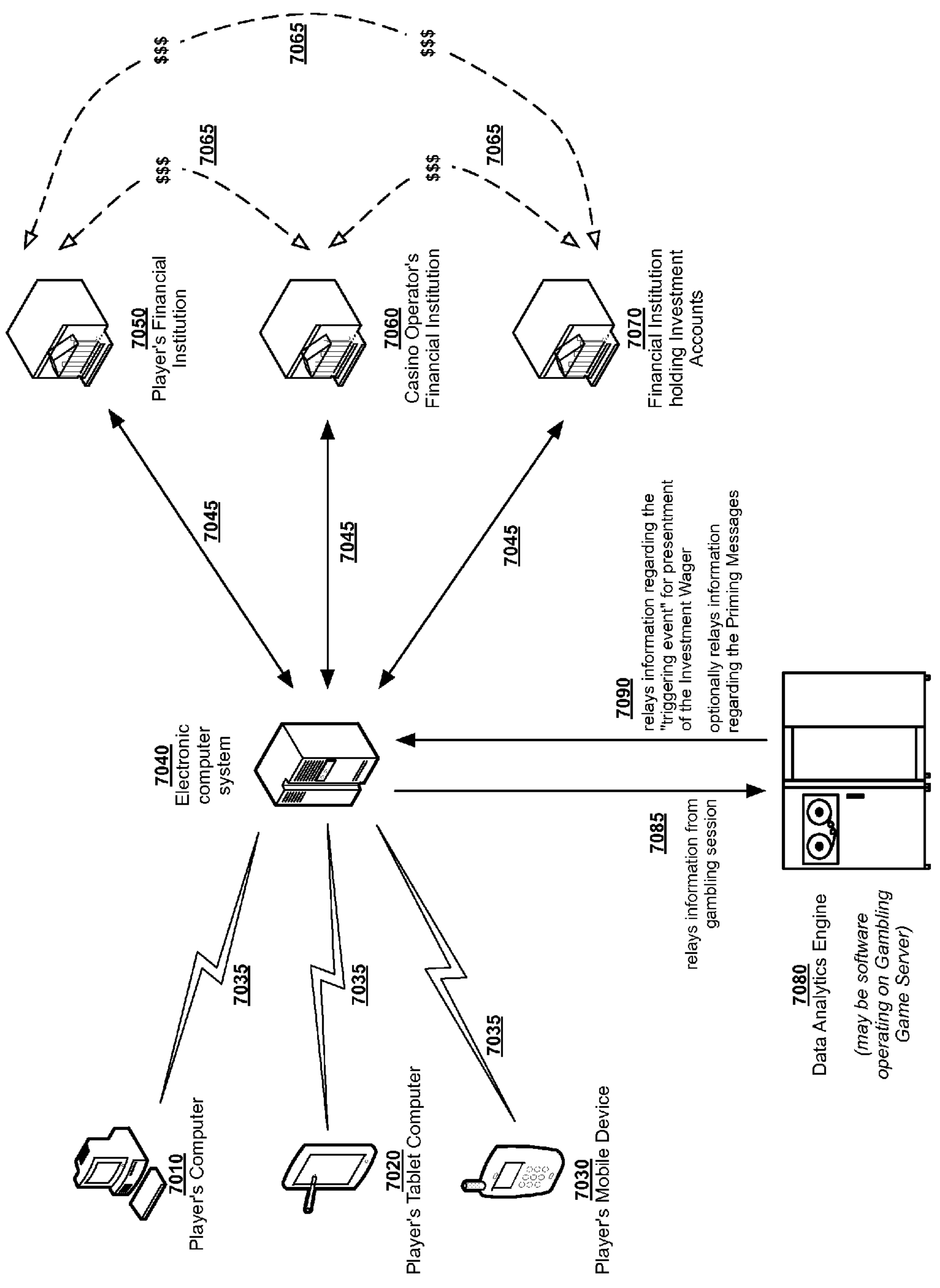
FIG. 7 is a depiction of an information technology system modified to implement the present disclosure, including an embodiment with a data analytics engine.

FIG. 7 presents an overview of the system architecture needed to implement selected embodiments of the disclosure.

The electronic gambling system is comprised of an electronic computer system 7040 that operates electronic gambling software that provides the electronic game of chance to the player and an optional data analytics engine 7080. The electronic gambling system is designed to implement the processes described in the disclosure and to facilitate the required funds transfers. The electronic gambling system is operated by a licensed online or electronic casino operator and will be subject to regulations of an applicable legal jurisdiction. A player intending to play the electronic games of chance on the electronic computer system will use electronic computing devices such as personal computers 7010, tablet computing devices 7020, or mobile devices and smartphones 7030 to interact with the electronic gambling system over the Internet or wireless communications networks 7035 so that he/she can place wagers on the games of chance.

Before the player may start a gambling session, the player will instruct the electronic computer system 7040 to electronically communicate 7045 with the player's financial institution 7050 and the casino operator's financial institution 7060. The player's funds will then be transferred from the player's account at the financial institution to the player's gambling account held at the casino operator's financial institution. The funds will be transferred using standard electronic payment systems, such as the Automated Clearing House (ACH) network or payment processors 7065. When the player accepts an Investment Wager, electronic computer system 7040 will electronically communicate 7045 with the casino operator's financial institutions to move the player's funds from his/her gambling account at the casino operator's financial institution 7060 to the financial institution holding the player's investment account 7070. Again, this transfer is made using standard electronic payment systems 7065.

Analytics of Player Behavior

Data analytics may be used to determine the optimal moment during a gambling session at which to offer the Investment Wager to the player. For the embodiments presented in FIGS. 1-4, the data analytics engine can calculate the optimal percentage(s) of the players' remaining gambling accounts (X %) at which to offer the Investment Wager(s) to players. Behavioral economics indicates that people become risk-seeking when all of the available potential outcomes are bad; it is possible that players may view investing the "piddling" amount of a low X % of their remaining gambling account as a "bad" outcome and may choose to risk all of their remaining funds on further gambling. It is surmised that players may become risk seeking when their remaining funds shrink to 20% or less of their gambling account, so it is proposed that the most effective X % values may lie in the 20-40% range. The data analytics engine will be used to determine the optimal X % amounts for the presentation of the Investment Wager as well as the optimal Y % values that will increase the likelihood that a player will accept the Investment Wager (while also taking into consideration which percentage ranges will best increase the revenue to the casino operator).

The likelihood that a player will accept an Investment Wager may be based upon such variable parameters as the amount of time a player has spent gambling, whether a player is on a "losing streak," how much of the gambling account remains (X %) and the amount of the additional offered amount (Y %). Therefore, the data analytics engine will record, store and analyze information related to these parameters so that it can determine an optimal time at which to present the Investment Wager(s) during a player's gambling session.

As depicted in FIG. 7, the data analytics engine 7080 will interface with the electronic computer system 7040 in order to receive information 7085 about certain parameters of the gambling session. This information may include: the gambling session's length of time (the amount of time a player has gambled); information related to the amount of monetary funds in the gambling account and the amount of funds lost from the gambling account (allowing a calculation of the X % values); information related to the wagers the player loses and wins during the gambling session, how many wagers the player has lost during a portion of the gambling session's length of time, and how many wagers the player has lost during the gambling session (the "win/loss" history of the player's wagers, including whether a player is on a "losing streak" or a "winning streak"); the time(s) during the gambling session at which the electronic computer system presents the priming message(s), and the time during the gambling session at which the player accepts the Investment Wager. The data analytics engine may store this information as "stored player information."

The "win/loss" history of the player's wagers, including whether a player is on a "losing streak" or a "winning streak" is included in the stored player information because such information may provide insights into how a player behaves in view of the "gambler's fallacy." This fallacy is a gambler's belief that future deviations are more likely if the gambler has observed deviations from expected game behavior. A common example of the gambler's fallacy involves a coin toss: if the coin is flipped either heads or tails multiple times in a row, persons subject to the fallacy will expect that the coin is "due" for the opposite side and the likelihood that the opposite side will appear is greater than 50%. The fallacy relies on the erroneous notion that chance events somehow "self correct" to a mean of the expected results. A player believing in the fallacy may expect that a string of good luck has ended and be more open to accepting the Investment Wager after experiencing a sudden turn of "bad luck." Likewise, a player of an electronic version of craps who believes himself to have a "hot hand" after a series of winning bets may believe his "hot hand" has ended and be more open to accepting the Investment Wager after the winning streak ends.

The data analytics engine can also instruct the electronic computer system 7040 to modify the X % values and Y % values to be used by the electronic computer system during "experimental" gambling sessions designed to collect data to be used by the data analytics engine. This data will also be included in the stored player information. The data analytics engine can vary these values during "experimental" gambling sessions and then measure the parameters related to the acceptance of Investment Wagers based on these variable X %, Y % values to determine an "optimal" range of percentages to increase the likelihood that a player will accept an Investment Wager. The data analytics engine 7080 can use the stored player information to determine the effect of the X %, Y % values on player behavior and can perform certain calculations to determine the optimal time at which to present the Investment Wager(s). Again, the data analytics engine will also include in its calculations of the X %, Y % values an analysis of the X %, Y % ranges which best increase the revenue to the casino operator.

In another embodiment, as the electronic computer system 7040 communicates with the data analytics engine 7080 during a gambling session 7085, the data analytics engine will monitor the player's gambling session and will calculate an ideal "wager triggering event" for the gambling session. This wager triggering event which will be the ideal time to present the Investment Wager and will arise when the values of certain of the aforementioned parameters fall within ranges which the data analytics engine has determined will cause the player to most likely to accept the Investment Wager (and which should also best increase the revenue to the casino operator). These parameters may be selected from the group consisting of: the amount of monetary funds in the gambling account associated with the player, the amount of monetary funds lost from the gambling account associated with the player, the gambling session's length of time, how many wagers the player has lost during a portion of the gambling session's length of time, and how many wagers the player has lost during the gambling session For example, the data analytics engine may calculate that the wager triggering event should occur when (a) the funds remaining in the player's gambling account (X %) falls within the range 20-30%, (b) when the player has played for at least twenty minutes, and (c) after the player has lost ten of the last fifteen wagers. When the wager triggering event is reached during the gambling session, the data analytics engine will prompt the electronic computer system 7040 to present the Investment Wager to the player, including the relevant Y % value(s) (also calculated using stored player information) 7090. Furthermore, the data analytics engine can also calculate whether to offer multiple Investment Wagers to the player when other wager triggering events are met during the gambling session, and instruct the electronic computer system accordingly 7090. As seen previously, the embodiments of FIGS. 1-4 base the triggering event on one parameter, namely, the X % value(s).

The data analytics engine may use the stored player information to calculate the optimal time(s) of the gambling session at which to present the priming message(s) to the player. Much like the calculation of the "wager triggering event," the data analytics engine 7080 can use the stored player information to determine the effect of the aforementioned parameters on player behavior and can perform calculations related to the optimal time at which to present the priming messages. As the electronic computer system 7040 communicates with the data analytics engine during a gambling session 7085, the data analytics engine 7080 will monitor the player's game, will calculate the ideal times at which to present the priming message(s), and instruct the electronic computer system 7040 when to present the electronic priming message(s) 7090 to the player during the gambling session.

The data analytics engine may use the stored player information to calculate the additional offered funds (Y %) that should be presented in the investment wager. Much like the calculation of the "wager triggering event," the data analytics engine 7080 can use the stored player information to calculate the value for the additional offered funds. As the electronic computer system 7040 communicates with the data analytics engine during a gambling session 7085, the data analytics engine 7080 will monitor the player's game, will calculate the value of the additional offered funds, and submit the value to the electronic computer system, which then causes the value of the additional amount of offered funds to appear in the Investment Wager presented to the player.

Embodiments with the Data Analytics Engine

Figure 8:
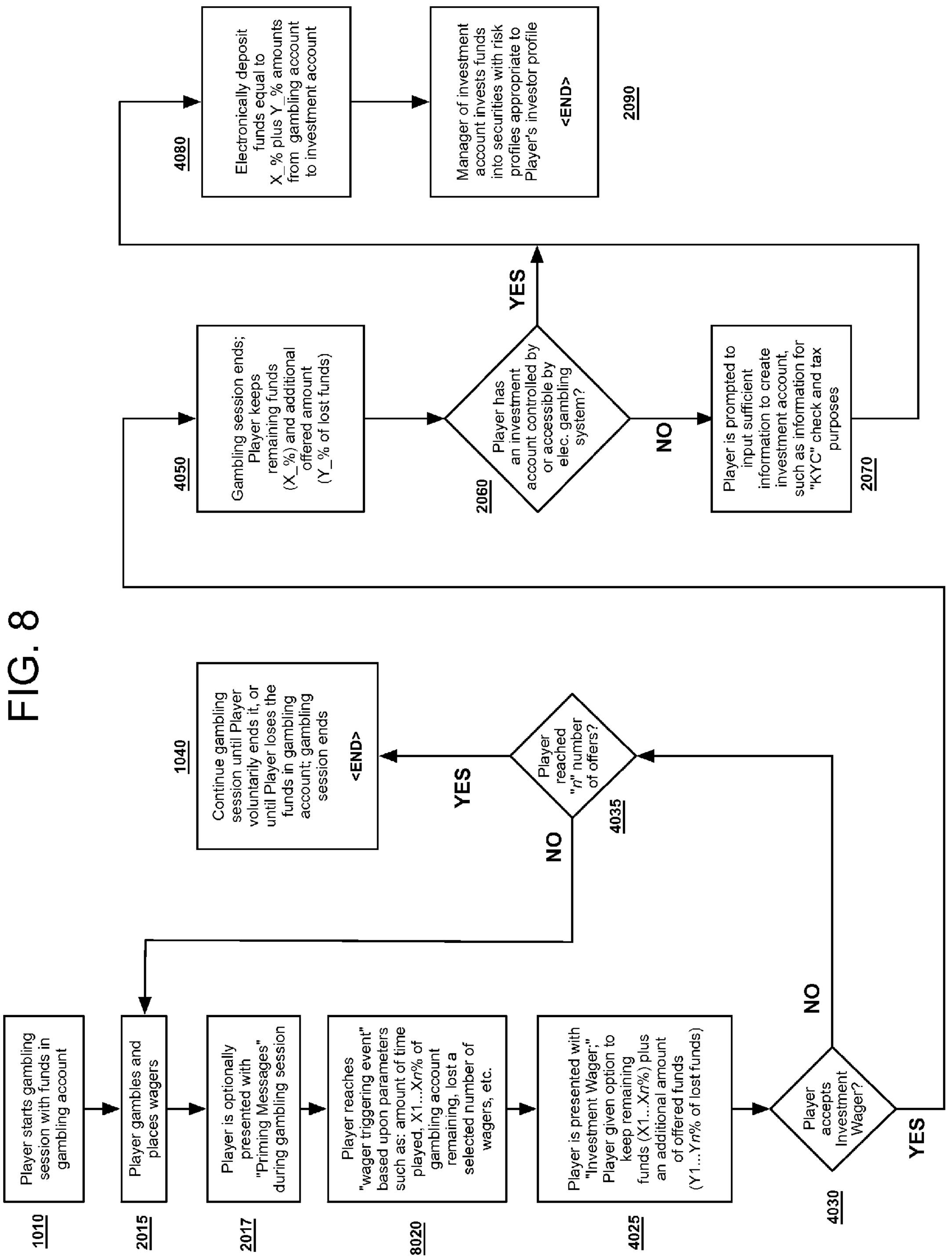
FIG. 8 is a flow chart diagram that depicts an embodiment of the disclosure in which n-number of "Investment Wagers" are offered to the player during the player's gambling session where the Investment Wagers are presented upon the occurrence of a "triggering event" based upon several variables.

FIG. 8 presents selected embodiments of the disclosure using the data analytics engine described above.

FIG. 8 presents an embodiment in which multiple Investment Wagers may be offered to the player. The embodiment in FIG. 8 differs from the embodiment in FIG. 4 in that the player is presented with the Investment Wager 4025 when the wager triggering event occurs 8020 instead of when the player's remaining funds equals X1 . . . Xn % of his/her gambling account 4020. Again, the wager triggering event arises when the values of certain of the aforementioned variables fall within ranges which the data analytics engine has determined will cause the player to most likely to accept the Investment Wager (and which should also best increase the revenue to the casino operator). The wager triggering event may be determined based upon the values of one or more parameters of the gambling session, selected from the group consisting of: the amount of monetary funds in the gambling account associated with the player, the amount of monetary funds lost from the gambling account associated with the player, the gambling session's length of time, how many wagers the player has lost during a portion of the gambling session's length of time, and how many wagers the player has lost during the gambling session Like the embodiment in FIG. 2, the embodiment in FIG. 8 may be an embodiment in which one Investment Wager is offered to the player by setting n equal to one. This embodiment presents the player with a single Investment Wager when the wager triggering event occurs 8020 instead of when the player's remaining funds equals X % of his/her gambling account. Again, the wager triggering event arises when the values of certain of the aforementioned variables fall within ranges which the data analytics engine has determined will cause the player to most likely to accept the Investment Wager (and which should also best increase the revenue to the casino operator).

Embodiments with the data analytics engine may use the data analytics engine to calculate the optimal times at which to present the priming messages as described above.

As stated previously, although it is unlikely that players who have winning gambling sessions will accept Investment Wagers, player behavior as measured by the data analytics engine may indicate otherwise. In embodiments with the data analytics engine, the data analytics engine may calculate the optimal points during "winning" gambling sessions to offer Investment Wagers to players, and can also calculate the size of the additional amounts (akin to the Y % of the player's lost funds) to be offered as "bonuses" to induce players to accept the presented Investment Wagers.

Overall, this disclosure provides online casino operators a way to differentiate their business from competitors, to add revenue through additional revenue sources, to build customer loyalty, and to promote themselves as offering a type of "socially responsible" gambling.

A person skilled in the arts of computer programming, information technology system architectures, information technology system design, and electronic communications technologies may use this written description and the Figures to build a system implementing the disclosed embodiments. After the gambling game software has been coded and developed, it may be made available on the Internet and may be played by gamblers using web browser applications or "native" applications on personal computers, mobile phones, smartphones, mobile computing devices, tablet computing devices or other electronic devices capable of interfacing with or networking with the electronic gambling system.

Although illustrated and described above with reference to certain specific embodiments and examples, the invention is nevertheless not intended to be limited to the details shown. Rather, various modifications may be made in the details within the scope and range of equivalents of the claims and without departing from the spirit of this disclosure. It is expressly intended, for example, that all ranges broadly recited in this document include within their scope all narrower ranges that fall within the broader ranges.

I claim:

1. A method for electronic gambling and investment, using a computer system, comprising the steps of:

- providing a player access to an electronic gambling system, wherein the electronic gambling system operates an electronic game of chance for use by the player;
- the player initiating a gambling session to play the electronic game of chance;
- the player playing the electronic game of chance using a wager from a gambling account associated with the player;
- the electronic gambling system presenting an investment wager to the player comprising a single offer to transfer into a separate investment account associated with the player:
  - (i) at least a portion of the monetary funds remaining in the gambling account associated with the player, and
  - (ii) an additional amount of funds offered by the casino, wherein the investment wager may be accepted or rejected by the player; and
- upon acceptance of the investment wager by the player:
  - (i) electronically ending the gambling session,
  - (ii) electronically depositing the at least a portion of the monetary funds remaining in the gambling account associated with the player and the additional amount of funds offered by the casino into the separate investment account associated with the player, and
  - (iii) purchasing securities using a least a portion of the monetary funds deposited into the separate investment account associated with the player.

2. The method for electronic gambling and investment, using a computer system, as described in claim 1, wherein the player plays the electronic game of chance using at least one of a personal computer, a mobile phone, a smartphone, a mobile computing device, a tablet computing device and another electronic device in communicative connectivity with the electronic gambling system.

3. The method for electronic gambling and investment, using a computer system, as described in claim 1, wherein the electronic game of chance is selected from the group consisting of: baccarat, bingo, blackjack, chuck-a-luck, craps, the dice wheel, dog racing, horse racing, keno, the money wheel, pachinko, pai gow, poker, roulette, slots, sports wagering and sic bo.

4. The method for electronic gambling and investment, using a computer system, as described in claim 1, wherein the investment wager is presented to the player based upon at least one of an amount of monetary funds within the gambling account associated with the player, an amount of monetary funds lost from the gambling account associated with the player, duration of the gambling session, how many wagers the player has lost during a portion of the gambling session, and how many wagers the player has lost during the entire gambling session.

5. The method for electronic gambling and investment, using a computer system, as described in claim 1, wherein the investment wager relates to the additional amount of funds offered by the casino presented to the player as a bonus or as a bet that the player will not accept the investment wager.

6. The method for electronic gambling and investment, using a computer system, as described in claim 1, wherein the additional amount of funds offered by the casino is equal to or greater than zero, but is less than the amount of monetary funds lost from the gambling account associated with the player during the gambling session.

7. The method for electronic gambling and investment, using a computer system, as described in claim 1, wherein the securities are chosen from among the group consisting of: index funds, exchange traded funds, mutual funds, bond funds, and money market funds and securities with risk profiles selected by the player.

8. The method for electronic gambling and investment, using a computer system, as described in claim 1, wherein an early withdrawal penalty will be applied to the investment account associated with the player should the player withdraw funds from the investment account before a predetermined period of time.

9. The method for electronic gambling and investment, using a computer system, as described in claim 1, wherein an entity regulated under applicable securities laws manages the investment account associated with the player.

10. The method for electronic gambling and investment, using a computer system, as described in claim 1, wherein the investment wager includes one or more of the elements from the group consisting of: a notice to the player of the number of investment wagers that will be presented to the player during the gambling session, a notice of the amount of monetary funds lost from the gambling account associated with the player during the gambling session, and an electronic avatar.

11. The method for electronic gambling and investment, using a computer system, as described in claim 1, wherein if the player wins the wager during the electronic game of chance, a portion of the winning proceeds from the wager are automatically deposited into the investment account associated with the player unless the player undertakes an voluntary action to alter such automatic deposit.

12. The method for electronic gambling and investment, using a computer system, as described in claim 11, wherein the wagers are selected from the group consisting of: odds bets in the game of craps, insurance bets in the game of blackjack, and proposition bets.

13. The method for electronic gambling and investment, using a computer system, as described in claim 1, wherein when the player voluntarily ends the gambling session, the electronic gambling system automatically deposits the monetary funds remaining in the gambling account associated with the player into the investment account associated with the player upon the player's request, or upon acceptance by the player of an offer to make the deposit with a bonus amount.

14. The method for electronic gambling and investment, using a computer system, as described in claim 1, wherein the electronic gambling system presents at least one investment wager to the player during the gambling session.

15. The method for electronic gambling and investment, using a computer system, as described in claim 1, wherein the electronic gambling system presents an electronic priming message to the player during the gambling session.

16. The method for electronic gambling and investment, using a computer system, as described in claim 15, wherein the electronic priming message contains content from the group consisting of: information on long term investing, information related to the value of the monetary funds the player has lost from the gambling account associated with the player during the gambling session, the projected return of an investment based on the value of the monetary funds the player has lost from the gambling account associated with the player during the gambling session, and information related to the wagers the player has lost during the gambling session.

17. An electronic gambling system, comprising:

an electronic computer system operating gambling software that provides an electronic game of chance to a player, said electronic computer system having functionality to deposit funds into and withdraw funds from accounts at financial institutions, the electronic computer system further having functionality that:

(a) allows the player to initiate a gambling session to play the electronic game of chance using at least one wager from a gambling account associated with the player;

(b) may present an electronic priming message to the player during the gambling session;

(c) presents an investment wager to the player upon the occurrence of a wager triggering event, said investment wager comprising a single offer to move into a separate account associated with the player (i) at least a portion of the monetary funds remaining in the gambling account associated with the player, and (ii) an additional amount of funds offered by the casino, wherein the investment wager may be accepted or rejected by the player; and (d) upon acceptance of the investment wager by the player, (i) electronically ends the gambling session, (ii) electronically deposits the at least a portion of the monetary funds remaining in the gambling account associated with the player and the additional amount of funds offered by the casino into the separate investment account associated with the player, and (iii) purchases securities using a least a portion of the monetary funds deposited into the separate investment account associated with the player.

18. The electronic gambling system, as described in claim 17, wherein the player plays the electronic game of chance using at least one of a personal computer, a mobile phone, a smartphone, a mobile computing device, a tablet computing device and another electronic device in communicative connectivity with the electronic gambling system.

19. The electronic gambling system, as described in claim 17, wherein the electronic game of chance is selected from the group consisting of: baccarat, bingo, blackjack, chuck-a-luck, craps, the dice wheel, dog racing, horse racing, keno, the money wheel, pachinko, pai gow, poker, roulette, slots, sports wagering and sic bo.

20. The electronic gambling system, as described in claim 17, wherein the wager triggering event is determined based upon the values of at least one of an amount of monetary funds within the gambling account associated with the player, an amount of monetary funds lost from the gambling account associated with the player, duration of the gambling session, how many wagers the player has lost during a portion of the gambling session, and how many wagers the player has lost during the entire gambling session.

21. The electronic gambling system, as described in claim 17, wherein the investment wager relates to the additional amount of funds offered by the casino presented to the player as a bonus or as a bet that the player will not accept the investment wager.

22. The electronic gambling system, as described in claim 17, wherein the additional amount of funds offered by the casino is equal to or greater than zero, but is less than the amount of monetary funds lost from the gambling account associated with the player during the gambling session.

23. The electronic gambling system, as described in claim 17, wherein the securities are chosen from among the group consisting of: index funds, exchange traded funds, mutual funds, bond funds, and money market funds and securities with risk profiles selected by the player.

24. The electronic gambling system, as described in claim 17, wherein an early withdrawal penalty will be applied to the investment account associated with the player should the player withdraw funds from the investment account before a predetermined period of time.

25. The electronic gambling system, as described in claim 17, wherein the investment wager includes one or more of the elements from the group consisting of: a notice to the player of the number of investment wagers that will be presented to the player during the gambling session, a notice of the amount of monetary funds lost from the gambling account associated with the player during the gambling session, and an electronic avatar.

26. The electronic gambling system, as described in claim 17, wherein if the player receives winning proceeds from the wager, a portion of the winning proceeds are automatically deposited into the investment account associated with the player unless the player undertakes an action to alter such automatic deposit.

27. The electronic gambling system, as described in claim 17, wherein the wagers are selected from the group consisting of odds bets in the game of craps, insurance bets in the game of blackjack and proposition bets.

28. The electronic gambling system, as described in claim 17, wherein when the player voluntarily ends the gambling session, the electronic gambling system automatically deposits the monetary funds remaining in the gambling account associated with the player into the investment account associated with the player, upon the player's request, or upon acceptance by the player of an offer to make the deposit with a bonus amount.

29. The electronic gambling system, as described in claim 17, wherein at least one investment wager is presented to the player during the gambling session.

30. The electronic gambling system, as described in claim 17, wherein the electronic priming message contains content from the group consisting of: information on long term investing, information related to the value of the monetary funds the player has lost from the gambling account associated with the player during the gambling session, the projected return of an investment based on the value of the monetary funds the player has lost from the gambling account associated with the player during the gambling session, and information related to the wagers the player has lost during the gambling session.

* * * * *

UNITED STATES PATENT AND TRADEMARK OFFICE

CERTIFICATE OF CORRECTION

PATENT NO. : 8,784,172 B1
APPLICATION NO. : 13/965549
DATED : July 22, 2014
INVENTOR(S) : Jeffrey Racho It is certified that error appears in the above-identified patent and that said Letters Patent is hereby corrected as shown below:

In the Claims

At column 19, claim number 1, line number 44, delete the word “the” and replace the deleted word “the” with the word “a”.

At column 21, claim number 17, line number 44, delete “the” and replace the deleted word “the” with the word “a”.

Signed and Sealed this
Twelfth Day of May, 2015

Michelle K. Lee
*Director of the United States Patent and Trademark Office*